United States Patent [19]
Heaney et al.

[11] Patent Number: 6,097,583
[45] Date of Patent: Aug. 1, 2000

[54] RAPID SHORT CIRCUIT PROTECTION FOR A MULTIPLE OUTPUT POWER SUPPLY

[75] Inventors: James A. Heaney, Durham; Randhir S. Malik, Cary, both of N.C.

[73] Assignee: International Business Machines Corporation, Armonk, N.Y.

[21] Appl. No.: 09/159,412

[22] Filed: Sep. 23, 1998

[51] Int. Cl.$^7$ ................................................. H02H 3/20
[52] U.S. Cl. ........................ 361/91.1; 361/91.5; 361/86
[58] Field of Search ...................... 361/59, 84, 86, 361/88, 91.1, 78, 91.5, 91.6, 18, 79, 90; 307/146, 4, 126, 127; 363/17–23, 50–56

[56] References Cited

U.S. PATENT DOCUMENTS

| | | | |
|---|---|---|---|
| 3,720,868 | 3/1973 | Lee | 363/89 |
| 3,930,194 | 12/1975 | Walker | 363/56 |
| 3,987,435 | 10/1976 | Ikeda | 341/128 |
| 4,270,157 | 5/1981 | Clark, Jr. | 361/35 |
| 4,541,058 | 9/1985 | Andow et al. | 364/483 |
| 4,797,774 | 1/1989 | Clayton et al. | 361/86 |
| 4,858,169 | 8/1989 | Fields | 708/823 |
| 5,233,497 | 8/1993 | Bremond et al. | 361/56 |

*Primary Examiner*—Jeffrey Gaffin
*Assistant Examiner*—Kim Huynh
*Attorney, Agent, or Firm*—Anthony N. Magistrale; Brian F. Russell; Andrew J. Dillon

[57] ABSTRACT

A direct current (DC) power supply supplies at least a first output and a second output having opposite voltage polarities. A protection circuit is coupled to the first and second outputs of the DC power supply, where the protection circuit includes a summing circuit that sums the voltages of the first and second outputs, an over-voltage detection circuit coupled to the summing circuit, and a shutdown latch. In the event of an overload or short circuit fault on one of the outputs of the power supply, the sum of the voltages of the first and second outputs exceeds a threshold voltage, causing the over-voltage detection circuit to output an over-voltage signal. In response to the over-voltage signal, the shutdown latch disables are at least one output of the DC power supply in order to prevent damage to its internal components.

15 Claims, 2 Drawing Sheets

RAPID SHORT CIRCUIT PROTECTION FOR A MULTIPLE OUTPUT POWER SUPPLY

BACKGROUND OF THE INVENTION

1. Technical Field

The present invention relates in general to electrical circuitry and in particular to a power supply for an electrical circuit. Still more particularly, the present invention relates to a multiple output power supply for an electrical circuit that has rapid short circuit protection.

2. Description of the Related Art

As illustrated in FIG. 1A, a conventional low cost direct current (DC) power supply 10 may have an alternating current (AC) input 8 and multiple DC outputs 11, 12, and 13. Because power supply 10 is a low cost power supply, not all of outputs 11–13 have a current limit. That is, outputs 11 and 12 may be limited to a maximum output current, while output 13 may not be so limited. In order to protect power supply 10 from damage in the event of a short circuit, outputs 11–13 of power supply 10 are connected to a short circuit protection circuit comprised of under-voltage detection circuit 14, time delay 16, and shutdown latch 18.

As shown, each of outputs 11–13 forms an input of under-voltage detection circuit 14, which transmits an under-voltage signal 15 to time delay 16 if the voltage of any of outputs 11–13 (i.e., $V_{11}$, $V_{12}$, and $V_{13}$) drops below a threshold voltage ($V_{th}$). In response to receipt of under-voltage signal 15, time delay circuit 16 waits for a selected interval, typically on the order of 250 milliseconds (ms), and then signals shutdown latch 18, which latches off power supply 10. The lengthy delay between the detection of the under-voltage condition and the shutdown of power supply 10 is required in order to avoid erroneously detecting a short circuit when an under-voltage condition occurs at power on.

Referring now to FIG. 1B, a timing diagram of the operation of the short circuit protection circuit is illustrated. As illustrated, the voltage of output 13 ($V_{13}$) is initially constant at a desired output voltage such as 12 V DC. Then, at time $t_0$, a short circuit fault occurs on output 13, which causes $V_{13}$ to decline until $V_{13}$ drops below $V_{th}$ at time $t_1$. Accordingly, under-voltage detection circuit 14 transmits an under-voltage signal 15 to time delay 16, which triggers the shutdown of power supply 10 by shutdown latch 18 at time $t_2$. Following shutdown of power supply 10, $V_{13}$ is zero.

A principal drawback to the short circuit protection provided to power supply 10 is that the power supply components coupled to output 13, which has no current limit, are subjected to extreme stress during the long dim interval between times $t_1$ and $t_2$. Because of this stress, the components may fail, resulting in a catastrophic failure of power supply 10. It would therefore be useful and desirable to provide improved short circuit protection for a multiple output power supply.

SUMMARY OF THE INVENTION

In accordance with the present invention, a direct current (DC) power supply supplies at least a first output and a second output having opposite voltage polarities. A protection circuit is coupled to the first and second outputs of the DC power supply, where the protection circuit includes a summing circuit that sums the voltages of the first and second outputs, an over-voltage detection circuit coupled to the summing circuit, and a shutdown latch. In the event of an overload or short circuit fault on one of the outputs of the power supply, the sum of the voltages of the first and second outputs exceeds a threshold voltage, causing the over-voltage detection circuit to output an over-voltage signal. In response to the over-voltage signal, the shutdown latch disables at least one of the outputs of the DC power supply in order to prevent damage to its internal components.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 2A:
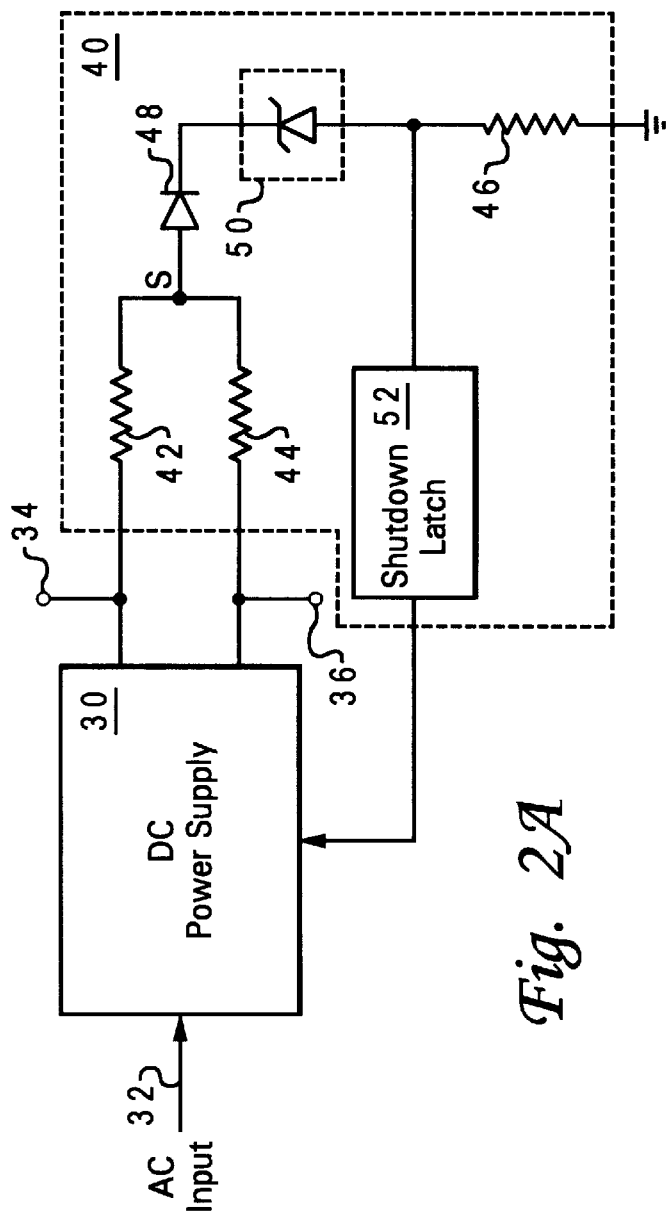
FIG. 2A depicts a power supply having a short circuit protection circuit in accordance with the present invention.

With reference again to the figures and in particular with reference to FIG. 2A, there is depicted an illustrative embodiment of power supply having short circuit protection in accordance with the present invention. As illustrated, a conventional low cost multiple-output DC power supply 30 has an AC input 32 and at least two DC outputs 34 and 36, where output 34 has a positive voltage ($V_{34}$) with respect to ground and output 36 has a negative voltage ($V_{36}$) with respect to ground. Output 34 is current limited by power supply 30, but output 36 is not current limited.

In order to provide short circuit and overload protection to power supply 30, outputs 34 and 36 of power supply 30 are coupled to a protection circuit 40, which includes resistors 42, 44, and 46, diode 48, an over-voltage detection circuit 50, and a shutdown latch 52. As shown, resistors 42 and 44, which may have the same or different values, are each connected between a respective one of outputs 34 and 36 and a summing node S. The voltage at summing node S ($V_S$) is given by the following equation:

$$V_S = (V_{34} * R_{44} + (-V_{36} * R_{42}))/(R_{42} + R_{44})$$

where $R_{42}$ and $R_{44}$ are the respective resistances of resistors 42 and 44 expressed in ohms and $V_{36}$ is the unsigned magnitude of the voltage at output 36. $V_S$ is applied to over-voltage detection circuit 50 through diode 48.

As illustrated, over-voltage detection circuit 50 is preferably implemented as a zener diode with a breakdown voltage selected based upon the specifications of the components within power supply 30 coupled to output 36. That is, the breakdown voltage ($V_{BD}$) of the zener diode is preferably selected to be less than the node voltage $V_S$ at which the components within power supply 30 are subject to failure. Of course, if more precise protection is desired, over-voltage detection circuit 50 can alternatively be implemented as a voltage comparator that outputs a high signal if $V_S$ exceeds a threshold voltage.

Over-voltage detection circuit 50 is further connected to shutdown latch 52. In response to receipt of a signal (i.e., current) from over-voltage detection circuit 50, shutdown latch 52 latches off power supply 30 such that the output voltages of both outputs 34 and 36 is 0 V DC until power supply 30 is reset by a manual switch or the power fault is cleared. Resistor 46 serves to develop a voltage for operating shutdown latch 52 in the event of a short circuit or an overload condition.

Figure 1A:
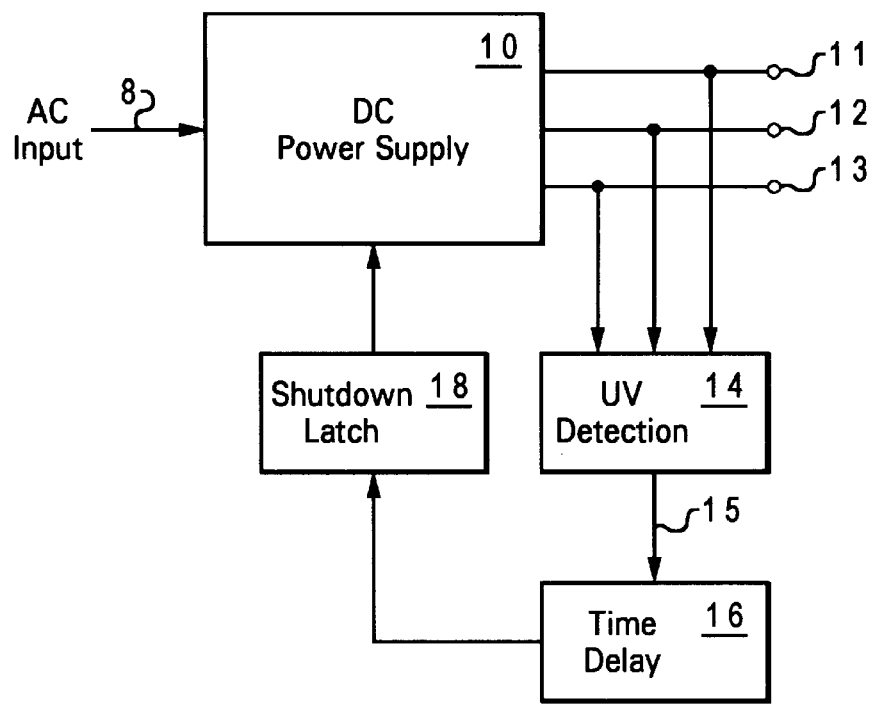
FIG. 1A illustrates a power supply having a conventional short circuit protection circuit.
Figure 1B:
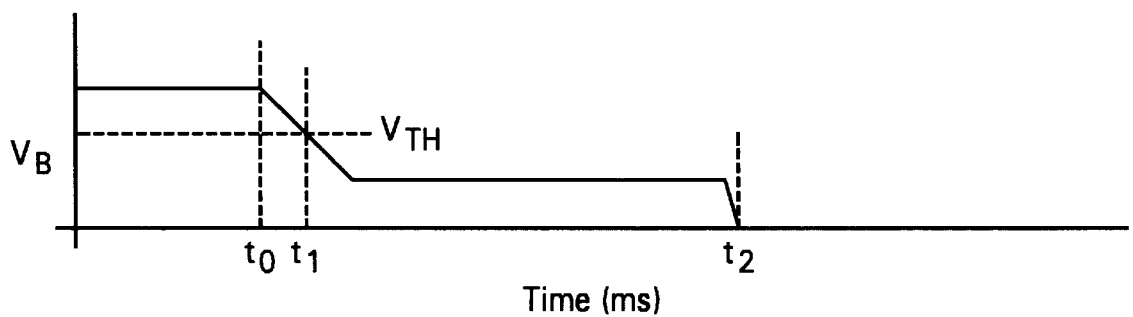
FIG. 1B is a timing diagram of the operation of the short circuit protection circuit illustrated in FIG. 1A.
Figure 2B:
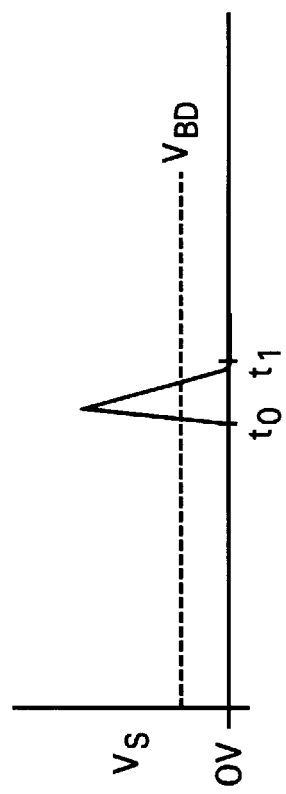
FIG. 2B is a timing diagram of the operation of the short are circuit protection circuit depicted in FIG. 2A.

Referring now to FIG. 2B, a timing diagram of the operation of protection circuit 40 of FIG. 2A is illustrated. As shown, during the operation of power supply 30, $V_S$ has some initial value, which can be computed according to the equation given above. For example, if $V_{34}$ and $V_{36}$ have equal magnitudes and opposite polarities (e.g., +12 V DC and −12 V DC) and $R_{42}$ is equal to $R_{44}$, the initial value of $V_S$ would be 0 V DC, as shown in FIG. 2B. When a short circuit fault or overload is subsequently applied to output 36 at time $t_0$, $V_{36}$ decays rapidly, and $V_s$ concomitantly increases until $V_S$ exceeds $V_{BD}$. At the point when $V_S$ exceeds $V_{BD}$, current begins flowing through the zener diode forming over-voltage circuit 50, and shutdown latch 52 latches off power supply 30 at time $t_1$. Following time $t_1$, both of outputs 34 and 36 have a voltage of 0 V DC until power supply 30 is manually reset or the short circuit fault is cleared. Importantly, because short circuit fault detection is performed utilizing over-voltage rather than under-voltage detection, no additional delay is required between times t0 and t1 to compensate for power on conditions. As a result, power supply 30 can be latched off before its internal components fail. For example, in a typical operating scenario, the interval between times $t_0$ and $t_1$ is approximately 1 ms as compared to the 250 ms shutdown time of the prior art circuit depicted in FIG. 1A.

As has been described, the present invention provides an improved short circuit protection circuit for a multiple-output DC power supply. In accordance with the present invention, the voltage of a first power supply output having a first polarity is summed with the voltage of a second power supply output having a second polarity. When the sum of the output voltages exceeds a predetermined voltage threshold due to a short circuit or overload at one of the power supply outputs, the power supply is immediately latched off in order to prevent damage to the components of the power supply.

While the invention has been particularly shown and described with reference to a preferred embodiment, it will be understood by those skilled in the art that various changes in form and detail may be made therein without departing from the spirit and scope of the invention.

What is claimed is:

1. A protection circuit for a direct current (DC) power supply having at least a first output and a second output, wherein said first output and said second output have opposite voltage polarities, said protection circuit comprising:
   summing means for summing voltages of said first output and said second output;
   an over-voltage detection means coupled to said summing means for indicating if said sum of said voltages of said first output and said second output exceeds a threshold voltage; and
   shutdown means for disabling at least one of said first and second outputs of said power supply in response to said indication of said over-voltage detection means.

2. The protection circuit of claim 1, wherein said over-voltage detection means comprises a zener diode.

3. The protection circuit of claim 2, wherein the DC power supply has an internal component coupled to said second output, wherein said zener diode has a breakdown voltage that is less than a sum of said voltages of said first and second outputs when one of said outputs is subjected to an short circuit or overload fault.

4. The protection circuit of claim 1, wherein said summing means comprises a summing node, a first resistor coupled between said first output and said summing node, and a second resistor coupled between said second output and said summing node.

5. The protection circuit of claim 1, and further comprising a diode a coupled in series between said summing means and said over-voltage detection means.

6. A protection circuit for a direct current (DC) power supply having at least a first output and a second output, wherein said first output and said second output have opposite voltage polarities, said protection circuit comprising:
   a summing circuit that sums voltages of said first output and said second output;
   an over-voltage detection circuit coupled to said summing means, wherein said over-voltage detection circuit outputs an over-voltage signal if said sum of said voltages of said first output and said second output exceeds a threshold voltage; and
   a shutdown latch that disables at least one of said first and second outputs of said power supply in response to said over-voltage signal.

7. The protection circuit of claim 6, wherein said over-voltage detection circuit comprises a zener diode.

8. The protection circuit of claim 7, wherein the DC power supply has an internal component coupled to said second output, wherein said zener diode has a breakdown voltage that is less than a sum of said voltages of said first and second outputs when one of said outputs is subjected to an short circuit fault.

9. The protection circuit of claim 6, wherein said summing circuit comprises a summing node, a first resistor coupled between said first output and said summing node, and a second resistor coupled between said second output and said summing node.

10. The protection circuit of claim 6, and further comprising a diode coupled in series between said summing circuit and said over-voltage detection circuit.

11. An apparatus, comprising:
    a direct current (DC) power supply having at least a first output and a second output, wherein said first output and said second output have opposite voltage polarities; and
    a protection circuit coupled to said first and second outputs of said DC power supply, said protection circuit including:
    a summing circuit that sums voltages of said first output and said second output;
    an over-voltage detection circuit coupled to said summing circuit, said over-voltage detection circuit outputting an over-voltage signal if said sum of said voltages of said first output and said second output exceeds a threshold voltage; and
    a shutdown latch that disables at least one of said first and second outputs of said power supply in response to said over-voltage signal.

12. The apparatus of claim 11, wherein said over-voltage detection circuit comprises a zener diode.

13. The apparatus of claim 12, said DC power supply having an internal component coupled to said second output, wherein said zener diode has a breakdown voltage that is less than a sum of said voltages of said first and second outputs when one of said outputs is subjected to an short circuit fault.

14. The apparatus of claim 11, wherein said summing circuit comprises a summing node, a first resistor coupled between said first output and said summing node, and a second resistor coupled between said second output and said summing node.

15. The apparatus of claim 11, and further comprising a diode coupled in series between said summing circuit and said over-voltage detection circuit.

* * * * *